United States Patent

[11] 3,556,178

[72] Inventor Walter Witschnig
Hofsteigasse 26, Schwarzach, Vororlberg, Austria
[21] Appl. No. 743,352
[22] Filed July 9, 1968
[45] Patented Jan. 19, 1971
[32] Priority July 13, 1967
[33] Austria
[31] 6562

[54] MACHINE FOR DIVIDING WOODEN PARTS INTO INDIVIDUAL CHANNEL-SHAPED ELEMENTS
24 Claims, 9 Drawing Figs.
[52] U.S. Cl. .................................................. 143/85, 83/5
[51] Int. Cl. ..................................................... B27b 5/12

[50] Field of Search ............................................ 143/85, 33; 83/5; 144/21

[56] References Cited
UNITED STATES PATENTS
2,780,896  2/1957  Jaye ............................ 143/85X
3,203,456  8/1965  Witschnig .................... 143/85

Primary Examiner—Donald R. Schran
Attorney—Cushman, Darby and Cushman

ABSTRACT: A machine for dividing wooden bodies into channel-shaped elements characterized by the use of a pair of guide ledges on a support surface to fit in each kerf to guide said bodies through said machine and kerf filling elements corresponding to the shape of the kerf cut by the preceding saw cylinder and loading means to urge said bodies toward said support surface.

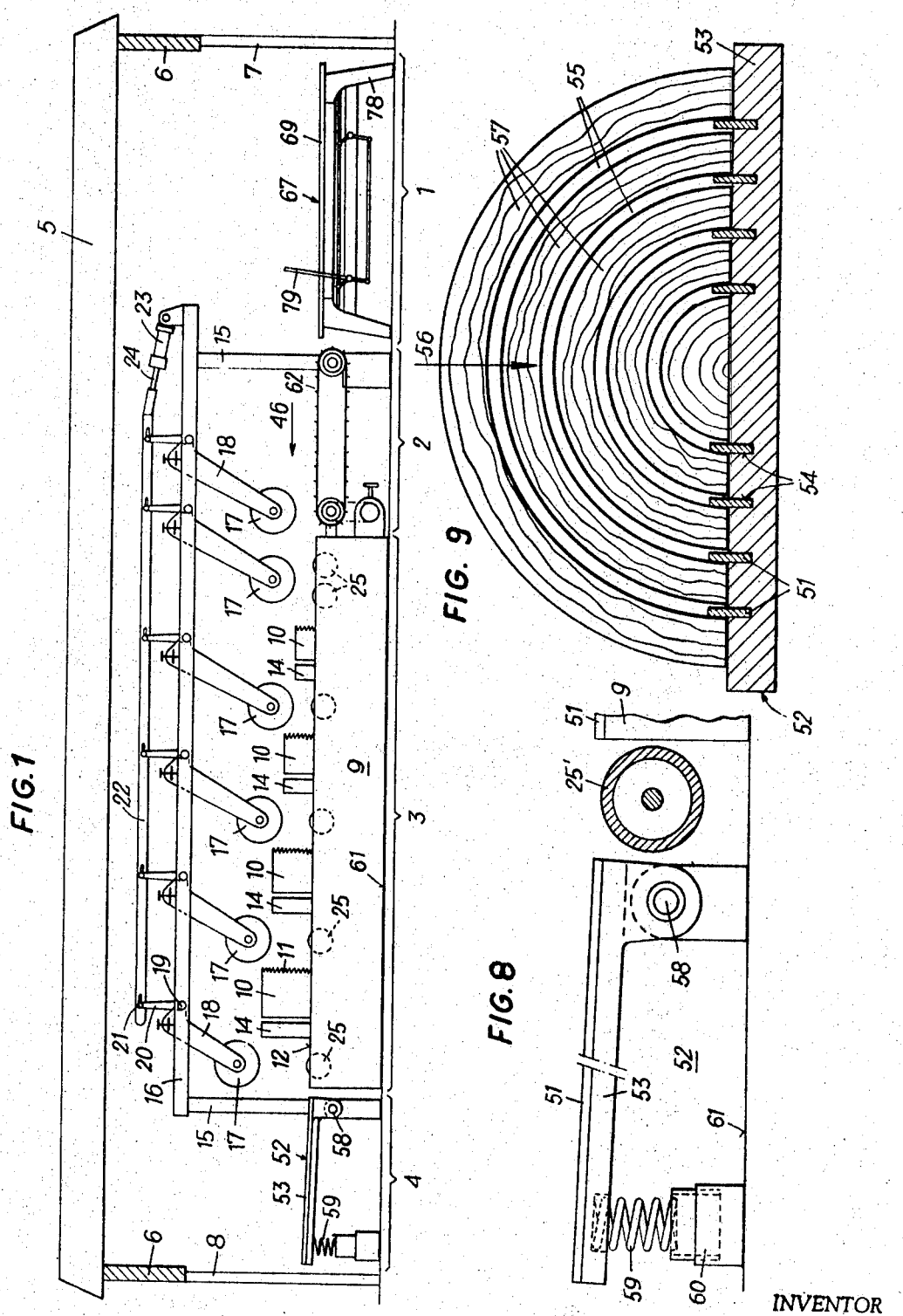

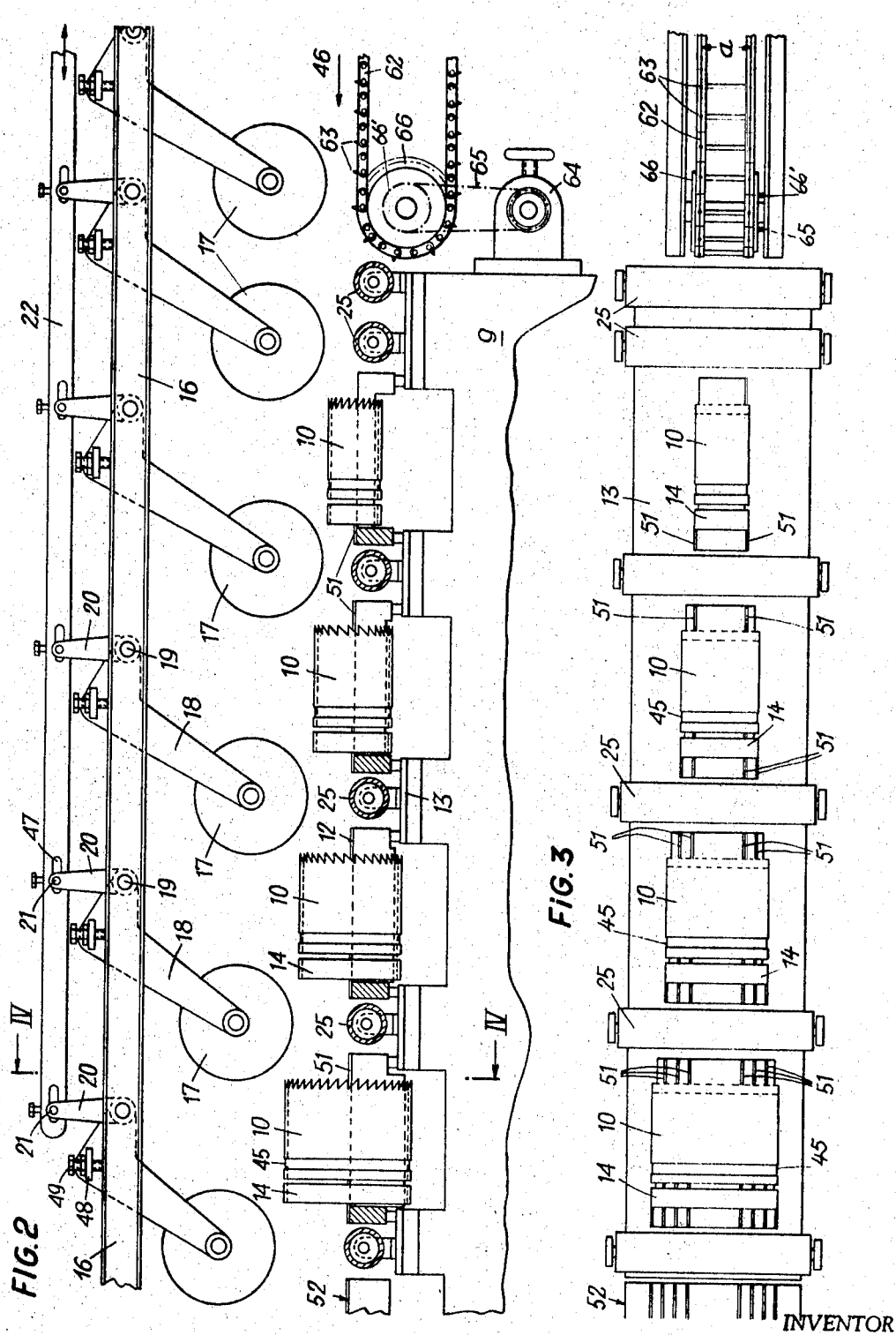

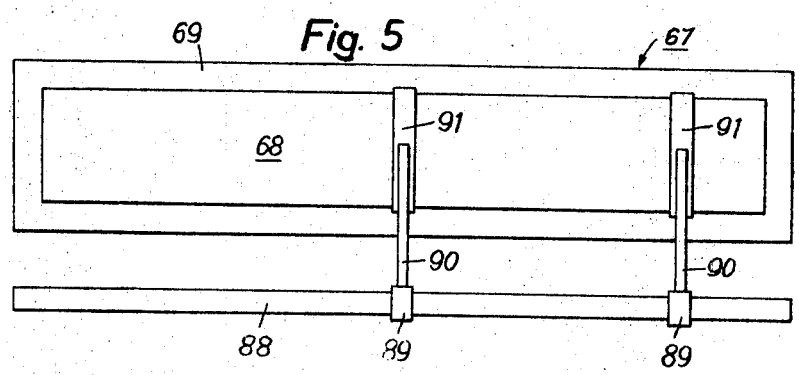
Fig. 5
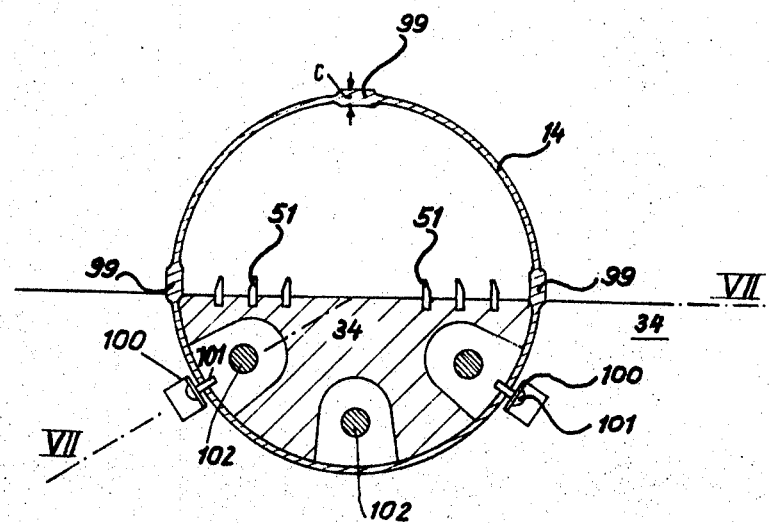
Fig. 6
Fig. 7
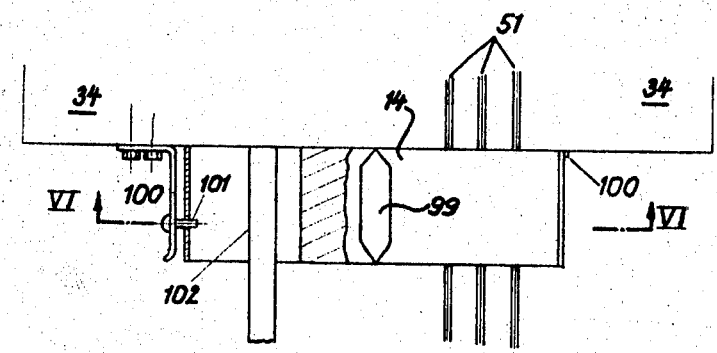
INVENTOR
WALTER WITSCHNIG
BY Cushman, Darby + Cushman
ATTORNEYS

MACHINE FOR DIVIDING WOODEN PARTS INTO INDIVIDUAL CHANNEL-SHAPED ELEMENTS

The present invention relates to a machine for dividing wooden parts, particularly trunks of trees, into individual channel-shaped elements, the outer and inner walls of which are part of circular cylinder surfaces. Such a machine is particularly used for sawing up trunk halves. It is known to provide such a machine with a plurality of cylindrical saws, the diameters of which are graduated according the diameters of the elements to produce, the cylindrical saws being arranged for rotation on a common axis and, relative to the feed direction of the wooden part, in succession, whereby each of said cylindrical saws is arranged with the cutting part of its circumference, preferably the upper half of its circumference, above a plane support for the wooden part and is rotated by a driving means, preferably by a belt engaging the cylindrical saw at its noncutting part of its circumference. The invention now aims at improving the construction of such a machine for producing channel-shaped wooden elements, particularly at improving precision of the cutting operation and precision of the wall thickness of the elements produced. The invention essentially consists in that a loading means if provided for pressing the wooden part at positions between the cylindrical saws against said plane support and in that at least in the area of the cylindrical saws lateral movement of the wooden part is avoided by a guide means. In practice the wooden part to be sawn up is not entirely rectilinear, so that it does not snuggly engage the plane support. Such conditions are in particular present with trunk halves which were irreversibly bent away from the axis of the trunk when cutting up the trunk. The loading means now acts against said bent of the trunk halves and causes the trunk halves with their plane face to snuggly engage the plane support. Now it is possible to saw up trunk halves into channel-shaped elements exactly and along half circles and cylindrical surfaces, respectively, which are coaxial relative to the axis of the undivided trunk. Said guide means prevents the trunk half from moving in a transverse direction relative to the feed direction under the action of the load means and the force exerted by the saws, respectively, so that bent cutting lines, relative to the longitudinal direction of the trunk are avoided. According to an embodiment of the invention the guide means is formed by projections engaging the lower surface of the wooden part and projecting from the plane support and, if desired, also from supporting surfaces being provided, seen in direction for feeding the trunk, in front of and behind said plane support, thus the wooden part to be cut up is extremely surely guided. Loading means is acting on the trunk half from above while the guide means engages the wooden trunk from downside. Such the wooden part is pressed by the loading means against the guide means, the efficiency of which is thereby improved. Preferably the arrangement is such that the projections are in the form of ridges, which engage the cutting gaps, produced by the cylindrical saws, of the wooden part. Said ridges extend in feed direction of the wooden part to be cut up. With this arrangement the cut gaps are made use of for guiding the wooden part to be cut up and it is further avoided that the cut gap is diminished by compression. This additionally provides the advantage that the cylindrical saws cannot be pinched. With this arrangement each individual channel-shaped element is supported at three points, which results in completely avoiding any movement of each element in lateral direction, particularly if according to a further feature of the invention the ridges engage the wooden part at the outer side of its cut gaps. Compression of the cut gaps can be further acted against if behind each cylindrical saw a cut gap filling element is arranged, the cross section of which corresponds to a section of the cut gap produced by the immediately forward cylindrical saw and enters the cut gap, thereby, preferably, filling the cut gap at least at circular sectors, completely. In this manner the channel-shaped elements are better guided at their lateral portions.

According to the invention the loading means may comprise rolls which are, if desired, by additional forces pressed against the trunk to be cut up and which are, preferably, arranged in the interstice of adjacent saw cylinders, and, if desired, in front of the first saw cylinder and behind the last saw cylinder, respectively. Such rolls, by their own weight and by the force eventually exerted upon the rolls additionally, are pressing the wooden part or the half trunk, respectively, against the plane support. Such arrangement of the rolls between adjacent saw cylinders has proved most effective, because each saw cylinder constitutes a shield against the roll pressure for the channel-shaped wooden parts situated within its circumference. For unobjectionable performance of the machine it is of importance to feed the half trunk exactly in the desired direction, because correction of the direction of the half trunk, once introduced, is not possible anymore. For this reason the direction of the half trunk has to be carefully adjusted before feeding it to the set of saw cylinders. For this purpose, according to the invention a trimming table is arranged, seen in feed direction, in front of the loading means, whereby also in the area of the trimming table a lateral guide for the wooden part or half trunk is effective, which is formed by clamps, shoes, edges or the like, preferably being guided by and adjustable on a rod in parallel relationship to the longitudinal axis of the machine. Such clamps or the like are fixed to the half trunk after adjusting its direction, whereby the clamps or the like may be provided with pointed projections, which securely engage the half trunk.

The invention is further illustrated with reference to the accompanying drawing, in which embodiments of the machine according to the invention are shown.

FIG. 1 is a side elevation of the complete machine according to the invention.

FIG. 2 shows the middle portion of the machine according to FIG. 1, where the loading means is provided, whereby the plane support is omitted.

FIG. 3 is a plan view of the middle portion of the machine shown in FIG. 2, the loading means being omitted for better clarity.

FIG. 5 is a plan view of the trimming table.

FIGS. 6 and 7 represent a cut gap filling element, whereby FIG. 6 is a section along line VI–VI of FIG. 7, and FIG. 7 is a plan view of FIG. 6, the fixing bolts being shown in the paper plane for better clarity.

FIG. 8 is a side elevation of the discharge table.

FIG. 9 is a section of the discharge table in an enlarged scale and seen in direction to the saw cylinders.

Figure 4:
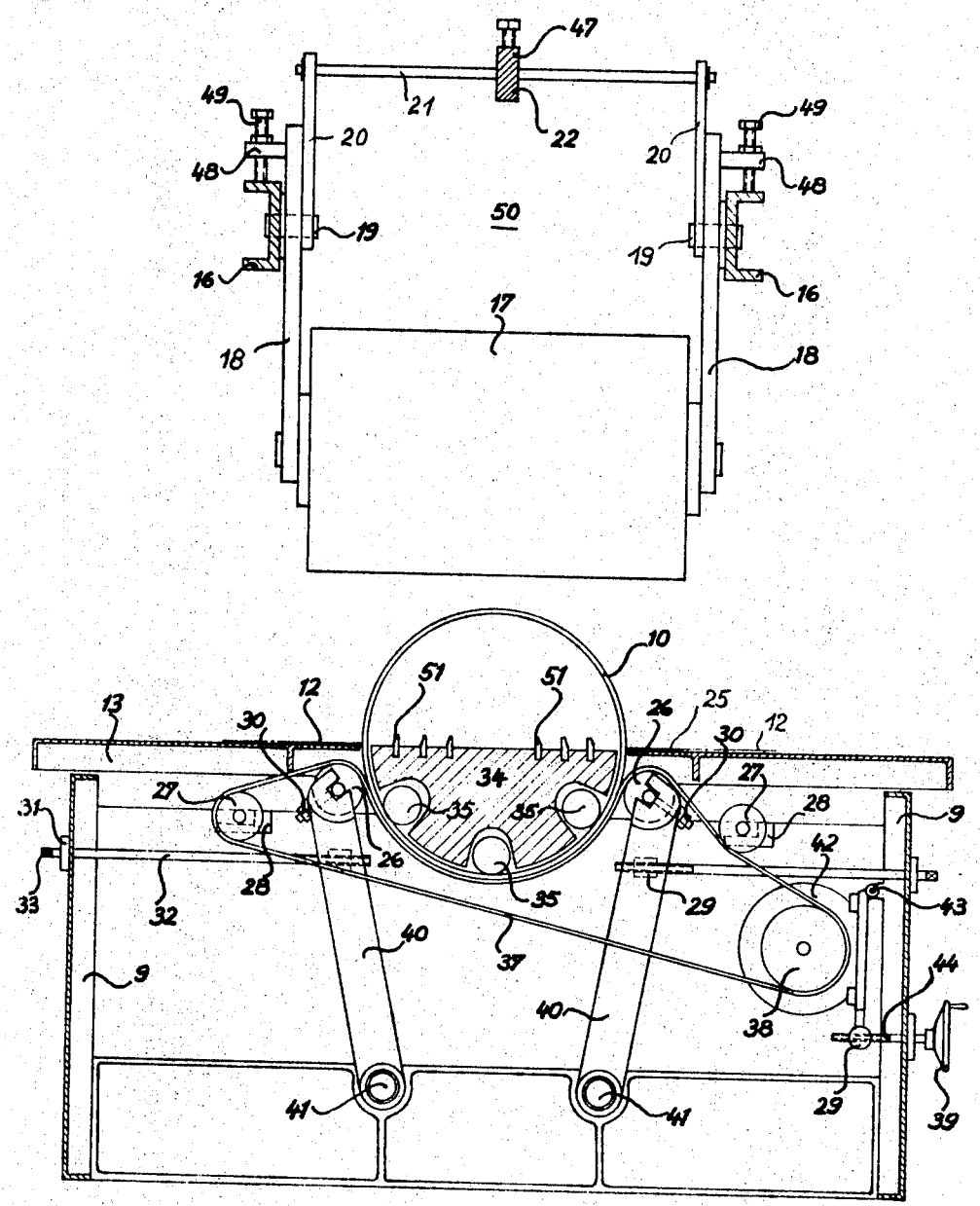
FIG. 4 shows in a section the driving means for a saw cylinder and its arrangement.

The plant shown in FIG. 1 is a machine for cutting up wooden half trunks and consists of four sections being arranged in series in direction of the feeding movement for the half trunk. The first section is formed by a trimming table 1, which is followed by a toothed chain serving as feeding mechanism and forming the second section. The third section 3 comprises the saw cylinders and also the loading means. The last section is formed by the discharge table 4. The plant is entirely shielded by a roof 5, supported by posts 6, between which, at the feeding end and at the discharge end, an opening 7 and 8, respectively, is situated.

The saw cylinder section 3 comprises a frame 9 within which a plurality of saw cylinders 10 is rotatably mounted. Each saw cylinder 10 is provided with a row of cutting teeth 11 at the end showing to the trimming table 1 and projects with its upper half of its circumference above the supporting plane 12 of the supporting table 13, formed by the frame 9 (FIG. 4). Behind each saw cylinder 10 a cut gap filling element 14 is stationary arranged for entering the cut gap produced by the saw cylinder 10, situated immediately in front of the respective filling element. Each cut gap filling element 14 is, at least at portions thereof, exactly formed according to the cross section of the cut gap produced by the preceding saw cylinder 10.

Above the frame 9 stringers 16 are arranged, which are supported by the posts 15 and carry the loading rolls 17. Such loading rolls 17 are provided between adjacent saw cylinders 10 and additionally in front of the first saw cylinder, i.e. in the area of the toothed conveyor chain 2, and behind the last saw cylinder 10. Each loading roll 17 is pivotally supported by supporting arms 18 being fixed each to a shaft 19, the shaft 19 being pivotally supported by stringers 16. To each shaft 19 (FIG. 4) linking arms 20 are fixed at both ends of the shaft 19, and at its free ends connected by rods 21. All rods 21 are connected by a connecting rod 22, at that end of which, which is situated near the feeding end of the plant, the piston rod 24 of a fluid motor 23 is pivotally connected. The cylinder of the fluid motor is linked to the stringers 16 or to the posts 15 as shown in FIGS. 1 and 2. In front and behind, respectively, of each saw cylinder 10 rollers 25 are rotatably mounted within the frame 9. The rollers 25 are arranged to extend with their apex a small distance above the supporting plane 12 of the supporting table for minimizing friction between the supporting table and the half trunk to be cut up. Each saw cylinder 10 is supported at its outer surface by rollers 26 which, as is shown in FIG. 4, are rotatably mounted in pivotable arms 40. Said pivotable arms 40 are pivotable on bolts 41. With each of said arms 40 a nut 29 is pivotally linked, which is engaged by one end of a threaded rod 23, the other end of which is pivotally linked such to the frame 9 that axial movement of said rod 32 is impossible. By putting a suitably formed wrench on the squared end 33 of the rod 32 and rotating said rod, the corresponding pivotable arm 40 may be angularly adjusted around its pivot 41 for adjusting the force which is applied by the rollers 26 to the saw cylinder 10.

The saw cylinder 10 is supported at its inner surface by a supporting part 34 within which rollers 35 are provided for minimizing friction forces. Said rollers engage the inner surface of the saw cylinder 10. The supporting part 34 is, as is shown in FIG. 2, fixed in its position, in front and behind of each saw cylinder, by suitable connection with the frame 9. The supporting part 34 conveniently serves as a mounting base for the cut gap filling element 14. The supporting parts 34 are removably mounted to the frame for enabling renewal of the saw cylinders 10.

The saw cylinders 10 are driven by a driving belt 37, which engages the lower circumference of the saw cylinder 10 and is pressed against this saw cylinder by means of the rollers 26. For more exact adjustment of the pressing force exerted by the rollers 26, adjusting screws 30 may be provided in addition to the threaded rods 32, by means of which adjusting screws 30 the play of the shafts of the rollers 26 within the arms 40 may be varied. The driving belt 37 is guided by rollers 27 rotatably supported in a rack 28. The driving belt 37 is put on the belt pulley 38 of a motor 42.

The motor is carried by a supporting plate 43, which is pivotally connected to the frame 9 and may be angularly adjusted with respect to its pivotal axis by means of a threaded rod 44, which engages a nut 29 pivotally linked to said supporting plate. By rotating the threaded rod 44 by means of a handwheel 39 prestress of the belt 37 may be adjusted such that rollers 26 are always pressed against the outer surface of the saw cylinder 10, thus improving frictional contact between belt 37 and saw cylinder 10.

To parry the axial thrust exerted by the half trunk on the saw cylinder 10, each saw cylinder 10 is, as shown in FIG. 2, provided with a circumferential groove 35, which is engaged by guide members or supporting members, for instance rollers or the like, being arranged within the frame 9, unmovable in longitudinal direction of the machine.

As is shown in FIG. 2 the diameters of the saw cylinders 10 are graduated according to the diameters of the channel-shaped wooden elements to produce. Such channel-shaped wooden elements are cut out of a half trunk in a manner known per se, the half trunk being pushed through the machine in direction of arrow 46, shown in FIG. 1. The half trunk, with its plane lower side, hereby rests on the plane supporting surface 12 of the supporting table 12 or the rollers 25, respectively. By the saw cylinders 10 from the half trunk channel-shaped wooden elements are cut out, the outer surface and the inner surface of which is essentially coaxial with respect to the annual circles of the half trunk.

Now experience has shown that such a half trunk or the cut face thereof is not completely rectilinear or plane, respectively, but is, seen from its rounded side, slightly concave. For compensating such a concave vault of the half trunk the mentioned loading rolls 17 are provided, which act on the half trunk such that its lower surface, the cutting surface, is pressed against the supporting plane 12 of the supporting table or against the rollers 25, respectively. Rolls 17 and rollers 25 may be driven for facilitating feeding movement of the half trunk and be additionally provided with a coating for increasing frictional forces (for instance rubber) or be roughened or toothed. All loading rolls 17 or at least some of the loading rolls 17 are arranged such that they can be lifted and thus are no hindrance when saw cylinders 10 are to be removed or other maintenance work has to be done. Lifting of the loading rolls 17 is effected by suitably actuating the fluid motor 23 and thus angularly moving arms 18 and 20 around the shafts 19. To provide for individual adjustment of each loading roll 17, the connecting rod 21 associated with its loading roll is guided within an elongated slot 47 (FIG. 2) formed in the tension rod 22 and is fixed in this slot in the desired position for instance by means of a setscrew or the like. Further each arm 18 is provided with a flange projecting from the arm in outward direction and provided with an adjusting screw 49, the lower end of which comes into engagement with the upper side of the stringer 16 formed by a channel member. Thus the extent of downward movement of each loading rod 17 may be adjusted. The respective rolls 17 conveniently are lowered such that their lowermost generatrice is positioned at the level somewhat higher than the apex of the immediately preceeding saw cylinder 10. With this the outer surface of the wooden part, which is cut out and trespasses the corresponding saw cylinder 10 is just engaged by the loading roll 17 and pressed down. With this arrangement it is possible to cut up half trunks of various diameters, particularly half trunks for which not all of the saw cylinders 10 are necessary.

To prevent the half trunk or the channel-shaped wooden elements cut therefrom from laterally moving under the action of the loading rolls 17 of the loading means 50 a lateral guide is provided for the half trunk and the channel-shaped wooden elements, respectively. In the range of the saw cylinder section 3, said guide is formed by ridges 51 (FIGS. 3, 4, 8 and 9), which project in upward direction from the support plane of the support table 13 and extend in longitudinal direction of the machine. Said ridges 51 are arranged to engage the cut gap or kerf produced by the immediately preceding saw cylinder 10. The ridges 51, arranged in the manner indicated, hold the channel-shaped wooden elements such that they cannot laterally move. As is shown in FIG. 9 such ridges 51 are also arranged in the region of a discharge table 52 (FIG. 1) formed by a pivotally supported supporting plate 53. As is shown by FIG. 9 each ridge 51, being inserted into grooves 54 of the supporting table 13 and of the supporting part 34 and of the supporting plate 53, respectively, has a substantially rectangular cross section, which is somewhat tapered in the upper portion of the ridge. Each ridge 51 is engaging with its outer face the outer wall of the respective cut gap or kerf 55, as shown in FIG. 9. The pressure exerted by the loading rolls 17 acting in direction of arrow 56 (FIG. 9) on the half trunk and the channel-shaped elements 57, causes each channel-shaped element to be held at three points of its circumference, so that the trunk and the channel-shaped elements are unobjectionably guided. As is shown in FIG. 3 the ridges 51 extend in longitudinal direction of the machine, beginning from behind the preceding saw cylinder 10 to the end of the supporting table 13 and are only interrupted in the area of the supporting rollers 25. The guiding action of the ridges 51 is assisted by the kerf filling elements 14 (FIGS. 1, 2 or 3) which, additionally, avoid the kerfs 55 from being compressed under the action of the force exerted by the loading rolls 17.

As is shown in FIG. 1, in the area of the discharge table 52 no loading rolls 17 are provided. For now to avoid that the channel-shaped wooden elements 57, which vault in upward direction in the area of the discharge table 52, disengage the ridges 51 of said discharge table, the discharge table 52 or its supporting plate 53, respectively, is pivotally arranged around an axis 58 (FIGS. 1 and 8), whereby the rearward end of the supporting plate 53 is supported by a compression spring 59. The lower end of said spring 59 rests on a socket 60 which can be screwn and unscrewn relative to a base placed on the floor. With this arrangement prestress of the compression spring 59 may be suitably adjusted. The rearward end of the supporting plate 53 is pushed in upward direction by the compression spring 59, so that the ridges 51 always are in engagement with the kerfs 55.

Conveniently, between the discharge table 52 and the frame 9 of saw cylinder section 3, a further roller 25' (FIG. 8) is arranged for providing a smooth passage for the channel-shaped elements on their way to the discharge table 52. Advancement of the half trunk through the machine is effected by means of a toothed conveyor channel 62 (FIG. 2), which is driven by a motor (not shown) via a continuously controllable gear 64, a chain 65 and sprocket wheels 66, 66'. The teeth 63 of the conveyor chain 62 securely advance the half trunk. For avoiding the teeth 63 from producing impressions in the channel-shaped wooden elements 57 (FIG. 9) and thus from impairing the quality of the channel-shaped elements, the distance $a$ between the two rows of teeth provided on the conveyor chain 62 exactly corresponds to the mean diameter of the kerf produced by the first saw cylinder 10, so that the impressions produced by the teeth 63 are cut away by the first saw cylinder 10.

To provide the possibility for exactly adjusting the direction of the half trunk to be cut up, in front of the toothed conveyor chain 62 a trimming table 67 (FIGS. 1 and 5) is provided, on which the position of the half trunk 68 in relation to the saw cylinders 10 may be laterally adjusted. Said trimming table 67 comprises a supporting plate 69 (FIG. 5) beside of which a tube 88 is stationary arranged in longitudinal direction of the machine, said tube serving as a sliding guide. Two sleeves 89 are pivotally arranged on said tube 88 for sliding movement in longitudinal direction and each sleeve 89 carries an arm 90, if desired adjustable in length. The free end of each arm 90 is provided with a point, a clamp, a collar or an equivalent part 91, which is fixed to the half trunk 68 after having been put thereon. If now the half trunk 68 is slideably moved on the supporting plate 69 of the trimming table, the sleeves 89 are guided by means of the tube 88 and maintain, via the arms 90, the half trunk 68 in the previously adjusted relative position to the saw cylinders 10. The supporting plate of the trimming table is provided with lateral recesses (not shown), which may be entered by an operator for adjusting the position of half trunks of short length.

As is shown in FIG. 1, the first loading roll 17 already is positioned above the rearward end of the conveyor chain 62. With this, advancement movement of the half trunk can be effected more reliably and the leading end of the half trunk advanced is with better security pressed against the surface of the supporting table.

FIGS. 6 and 7 show a kerf filling element 14 in an enlarged scale. Said kerf filling element is provided with thickenings or elevations 99. In the area of the thickenings 99 the thickness $c$ of each kerf filling element 14 corresponds to the width of the kerf cut by the immediately preceding saw cylinder. At the areas between the thickenings 99 a small gap is present between the kerf filling element 14 and the inner surface of the outer channel-shaped element and the outer surface of the inner channel-shaped element, so that friction between the channel-shaped element and the kerf filling elements 14 is minimized and further sawdust remaining within the kerfs cannot be of disturbance. For facilitating such action, the thickenings 99 are, as is shown in FIG. 7, given a pointed form at both ends. However, for keeping the major portion of the sawdust from entering the kerfs, stripping plates (not shown) are arranged at least inside of each cylindrical saw, said stripping plates, in a manner known per se, resiliently engaging the saw cylinder.

The kerf filling elements 14 are fixed to the supporting pieces 34 by means of leaf springs 100, which are fixed to the supporting piece 34 by means of screws and which at their free ends are provided with inwardly projecting bolts 101, engaging bores provided in the kerf filling elements 14. This enables rapid interchange of kerf filling elements 14 in case that saw cylinders were substituted by saw cylinders of smaller or bigger width.

In FIG. 6 the pivots of the rollers 35 (FIG. 4) are given the reference numeral 102.

To internally compensate the reaction forces exerted by the saw cylinders 10 on the wooden part to be cut up as far as possible, the saw cylinders are rotated clockwise and counterclockwise. This may be effected by means of motors 42 (FIG. 4) driven in contrary direction, or by means of interposition of reversing gears.

I claim:

1. A machine for cutting wooden bodies into individual channel-shaped elements, the outer and inner walls of which are part of circular cylinder surfaces, by advancing said wooden bodies along a longitudinal axis through said machine from the front to the rear of said machine, comprising a frame, a set of saw cylinders with circular cross section, the diameters of which are graduated according to the diameters of said elements to be produced and which, seen in the direction of advancement of the wooden body are arranged on said frame in succession, a supporting table for supporting said wooden body on a plane, each saw cylinder being arranged with the upper part of its cutting circumference above the plane of said supporting table, a drive belt for each of said saw cylinders, said belt engaging only the noncutting part of the circumference of said saw cylinder, a loading means for pressing the wooden body at positions between said saw cylinders against said supporting table, a pair of guide ledges for each kerf cut by said saw cylinders, said guide ledges being arranged, at least, in the area of the saw cylinders and projecting from the plane of said supporting table in upward direction and engaging the lower surface of said wooden body by entering the kerfs cut by said saw cylinders, said guide ledges extending in the direction of advancement of said wooden body for preventing lateral movement of said wooden body and said channel-shaped elements, and, a stationary kerf filling element behind each saw cylinder, at least a portion of the cross section of said kerf filling element corresponding to the shape of the kerf cut by the preceding saw cylinder, said kerf filling element entering said kerf when said body is advanced through said machine.

2. A machine as claimed in claim 1, wherein said guide ledges engage the outer walls of said kerfs.

3. A machine as claimed in claim 1, wherein said guide ledges are arranged symmetrically in pairs relative to the longitudinal axis of said machine.

4. A machine as claimed in claim 1, wherein said kerf filling elements are provided with a thickened portion extending in the advancement direction of said wooden body the greatest thickness of said thickened portion corresponding to the width of the kerf.

5. A machine as claimed in claim 4, wherein said thickened portions are tapered and have a pointed end at their forward edge seen in the direction of advancement of said wooden body.

6. A machine as claimed in claim 5 wherein said kerf filling elements are resiliently fixed to the frame.

7. A machine as claimed in claim 6, wherein the loading means comprises, rollers which are arranged between adjacent saw cylinders, and pivotable levers with one end pivotably connected to the machine frame, said rollers being rotatably supported on the other end of said levers.

8. A machine as claimed in claim 7, wherein the rollers have additional loading means forcing said rollers against said bodies.

9. A machine as claimed in claim 8, wherein additional load rollers are arranged in front of the first saw cylinder and behind the last saw cylinder.

10. A machine as claimed in claim 9, wherein means are provided for lifting said load rollers.

11. A machine as claimed in claim 10, wherein said lifting means comprises, a fluid actuator, and a connecting rod moved by said fluid actuator, said connecting rod being attached to said pivotable levers so that as said connecting rod is moved by said fluid actuator said load rollers are lifted from said wooden body.

12. A machine as claimed in claim 11, wherein each pivotable lever is provided with stop means on said machine for limiting the extent of upward and downward movement of each of said loading rollers.

13. A machine as claimed in claim 12, wherein supporting rollers are provided within the zone of the loading means for minimizing frictional forces acting against advancement of said wooden body through said machine, shafts about which said rollers rotate being mounted on said frame perpendicular to the longitudinal axis of said machine, the circumference of said rollers projecting above the supporting plane of said supporting table, said guide ledges projecting from said supporting plane of said supporting table in an upward direction being discontinued in the zone of said rollers.

14. A machine as claimed in claim 1, wherein said guide ledges extend behind the last loading roller in the direction of advancement of the wooden body.

15. A machine as claimed in claim 14, wherein a discharge table is provided, said discharge table extending from the rear of the supporting table, discharge guide ledges on said discharge table aligned with said guide ledges on said supporting table.

16. A machine as claimed in claim 15, wherein means are provided for adjusting the height of the rear end of said discharge table.

17. A machine as claimed in claim 1, further comprising a trimming table, said trimming table being arranged in front of the first loading means, lateral guide means for the wooden body to be cut on said trimming table, said lateral guide means having fastening means for engaging the wooden body to be cut.

18. A machine as claimed in claim 17, wherein said guide means comprises a rod extending along said trimming table parallel to the longitudinal axis of the machine, and sleeves slidable on said rod, and wherein said fastening means comprises clamps mounted on said sleeves for engaging said wooden body.

19. A machine as claimed in claim 17, wherein access recesses are provided in the supporting surface of said trimming table.

20. A machine as claimed in claim 1, wherein loading means are provided in front of said first saw cylinder and behind said last saw cylinder.

21. A machine as claimed in claim 1, further comprising an endless chain for advancing said wooden body to be cut, said chain being arranged in front of said first saw cylinder, said chain having catch means for engaging said wooden body.

22. A machine as claimed in claim 21, wherein said catch means comprises rows of teeth, wherein the distance between said rows of teeth measured perpendicularly to the direction of travel of the wooden body is equal to the distance between the kerfs cut by said saw cylinders so that holes in said wooden body caused by said rows of teeth are cut out by said saw cylinders.

23. A machine as claimed in claim 1, wherein one-half of said saw cylinders are rotated in a direction opposite to the direction of rotation of the remaining saw cylinders.

24. A machine as claimed in claim 23, wherein the direction of rotation of successive saw cylinders is alternating, so that counterclockwise rotating saw cylinders are each situated between two clockwise rotating saw cylinders.